July 5, 1960

H. N. K. PATON 2,943,891

UNLOADING FLOOR MAT

Filed Dec. 7, 1956

4 Sheets-Sheet 1

INVENTOR
HAMILTON NEIL KING PATON
BY
Fetherstonhaugh & Co.
ATTORNEYS

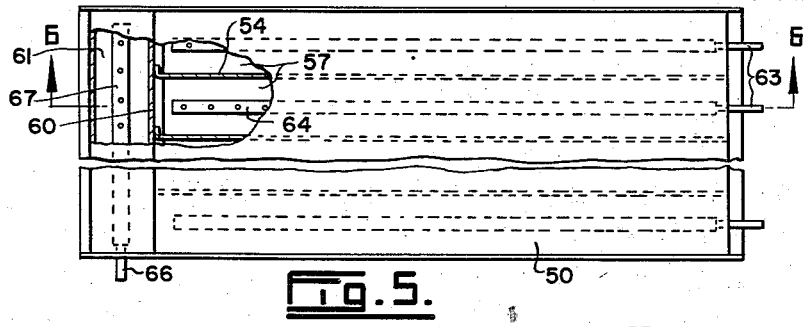
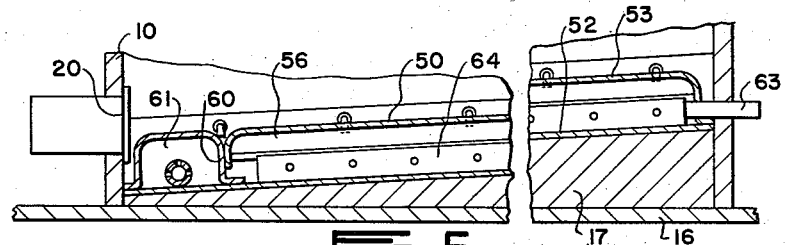
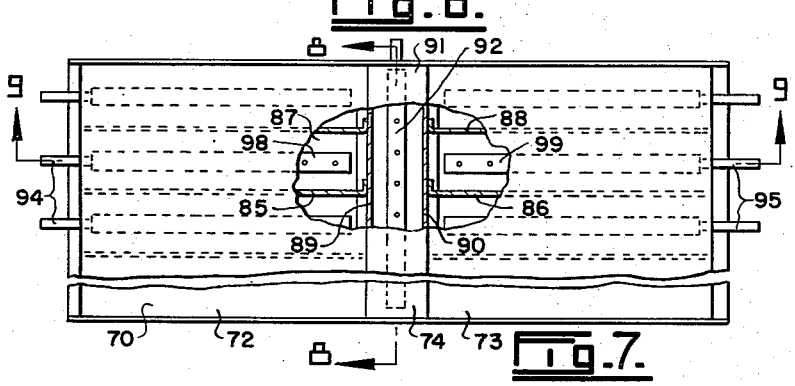
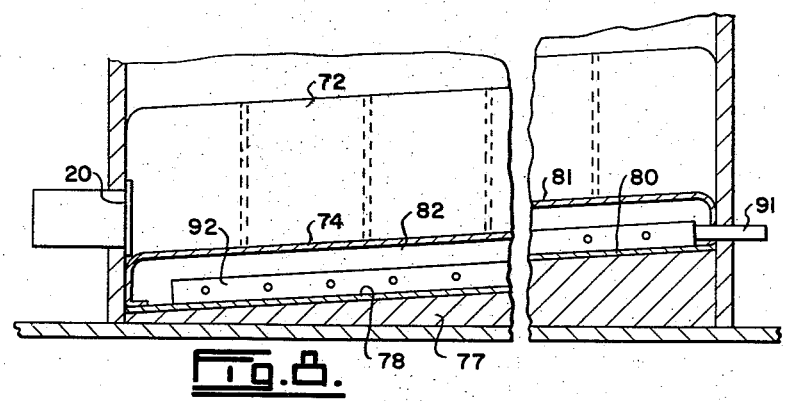

July 5, 1960 H. N. K. PATON 2,943,891
UNLOADING FLOOR MAT
Filed Dec. 7, 1956 4 Sheets-Sheet 3

INVENTOR
HAMILTON NEIL KING PATON
BY
*Fetherstonhaugh & Co.*
ATTORNEYS

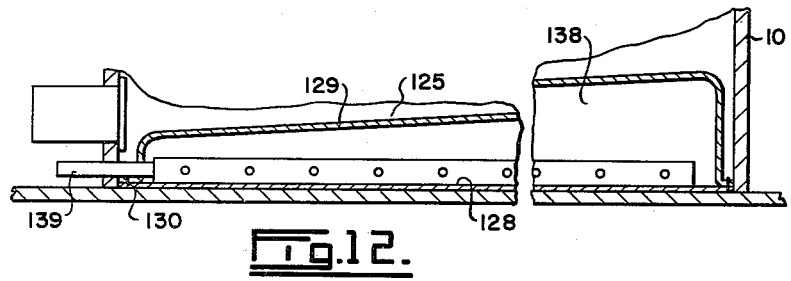
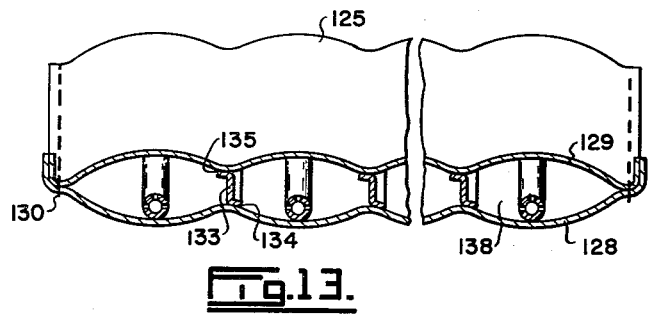
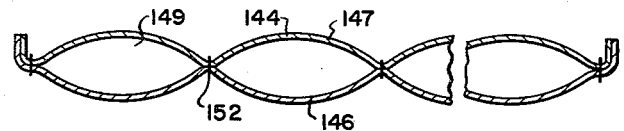

United States Patent Office 2,943,891
Patented July 5, 1960

2,943,891
UNLOADING FLOOR MAT

Hamilton Neil King Paton, 4279 Pelly Road,
North Vancouver, British Columbia, Canada Filed Dec. 7, 1956, Ser. No. 627,017

7 Claims. (Cl. 302—29)

This invention relates to a floor mat which may be placed on the bottom of any type of storage compartment in order to fluidize materials in small particle form which are placed on this mat in the compartment in order to assist the flow of said materials from the compartment.

An object of the present invention is the provision of a fluidizing or unloading floor mat which may be placed in any type of mobile or stationary storage compartment, such as a freight barge, freight car, truck or warehouse, in order to enable materials in small particle form to be placed in the compartment and easily removed therefrom by gravity or mechanical pneumatic means, thus enabling the compartment to be used for the bulk transportation or storage of powder or granular materials, such as cement, dry chemicals and the like. This fluidizing mat may be quickly and easily inserted in the compartment and removed therefrom so that the compartment may be used for any of its usual purposes as well as for small particle materials. Furthermore, the mat may be folded up into a compact bundle for shipping or storage purposes.

A portable fluidizing or unloading floor mat according to the present invention may be of any desired shape and comprises a bottom layer of gas-impervious material and an upper layer of gas-pervious material, said layers being secured together at the periphery of the mat. If desired, one or more substantially vertical webs may connect these layers together to prevent the upper one from billowing away from the lower layer. These layers form between them a distributing chamber. Each web may have one or more holes therein, in which case a single means is provided for directing gas into the chamber. However, some or all of the webs may not have holes in them so that they divide the chamber into a plurality of independent sections, in which case it is necessary to provide means for directing gas into each section. Instead of webs, the bottom and upper layers may be sewn or glued to each other along spaced lines.

Figure 1:
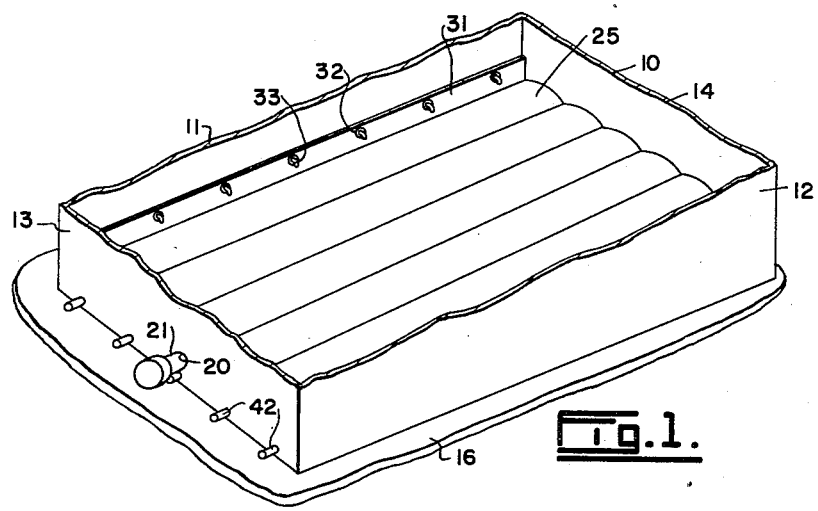
Figure 2:
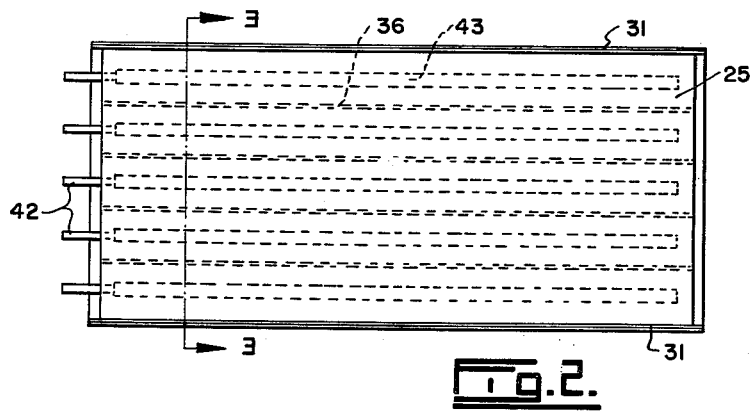
Figure 3:
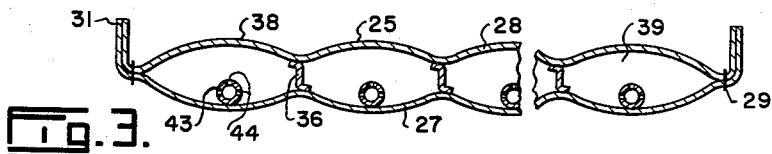
Figure 4:
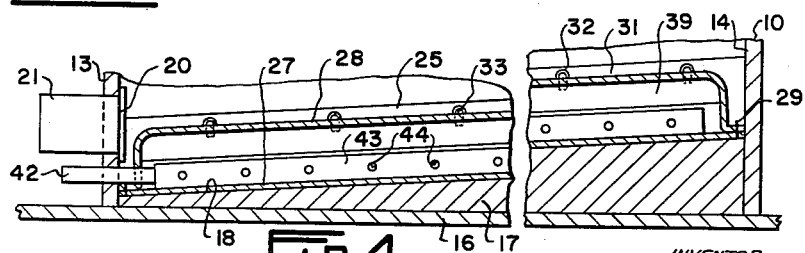

Examples of this invention are illustrated in the accompanying drawings, in which, Figure 1 diagrammatically illustrates a storage compartment with the walls thereof broken away in order to show a fluidizing floor mat therein, Figure 2 is a plan view of one form of fluidizing floor mat, Figure 3 is an enlarged section taken on the line 3—3 of Figure 2, Figure 4 is a longitudinal section through the storage compartment and the mat of Figure 2.

Figure 9:
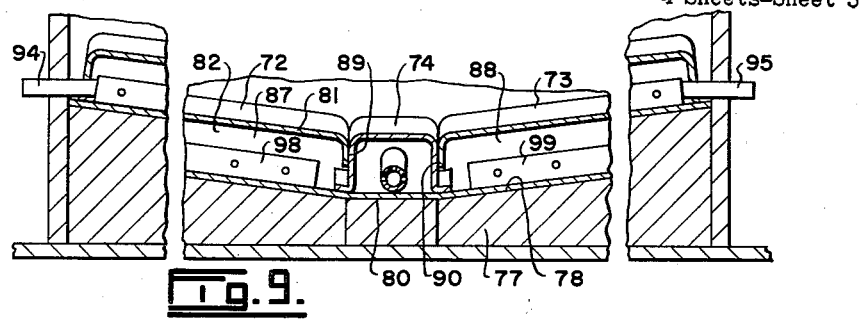
Figure 10:
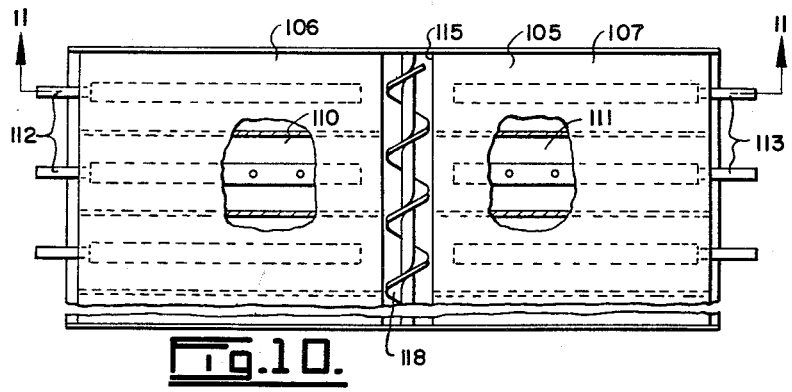
Figure 11:
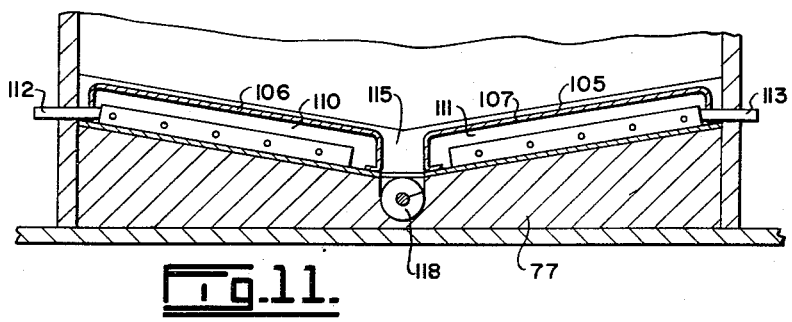

Figure 5 is a plan view of another form of fluidizing floor mat,

Figure 6 is an enlarged longitudinal section taken on the line 6—6 of Figure 5, and including the storage compartment bottom and walls, Figure 7 is a plan view of another form of fluidizing floor mat, Figure 8 is an enlarged section taken on the line 8—8 of Figure 7, and including the storage compartment bottom and walls, Figure 9 is an enlarged section taken on the line 9—9 of Figure 7, also including the storage compartment bottom and walls, Figure 10 is a plan view of still another form of fluidizing floor mat, Figure 11 is an enlarged section taken on the line 11—11 of Figure 10, including the storage compartment bottom and walls, Figure 12 is a longitudinal section through a storage compartment and a form of mat which is slightly different from that shown in Figures 1 to 4, Figure 13 is a cross section through the mat of Figure 12, and Figure 14 is a cross section through a mat which is another variation of that shown in Figures 1 to 4.

Referring to Figures 1 to 4 of the drawings, 10 represents a storage compartment having side walls 11 and 12, and end walls 13 and 14. This compartment has a floor 16 which may be sloped or horizontal. If it is horizontal, it is preferable to provide a sub floor 17 on top of floor 16 and which has a sloping upper surface 18. If the storage compartment is intended to be used for different purposes, the sub floor may be removably mounted therein. The surface 18 of the sub floor is inclined towards a discharge outlet 20 in the end wall 13 of the compartment, and a discharge pipe 21 may extend outwardly from this outlet.

A fluidizing floor mat 25 is spread out over the bottom or floor of compartment 10 and completely covers said bottom. This mat is made up of a bottom layer 27 of gas-impervious material, and an upper layer 28 of a gas-pervious material forming a gas chamber 29 therebetween. For example, canvas may be used for the bottom layer which has been treated to prevent the passage of gas therethrough, while the upper layer may be untreated canvas. The mat is made the same shape as the floor of the compartment in which it is to be used, and in the illustrated example, it is rectangular. It will, however, be understood that the mat may be circular or any other desired shape. The layers 27 and 28 are secured together around the peripheries thereof as at 29 by stitching and/or gluing or any other suitable means. It is preferable to provide flanges 31 along at least two opposite edges of the mat in order that the latter may be permanently or removably secured in place in compartment 10. In this example, the flanges 31 are provided with grommets 32 therein which fit over hooks 33 in walls of the compartment near the bottom thereof. This keeps the mat on the compartment floor.

In order to prevent layer 28 from billowing upwardly from layer 27, one or more, usually several, webs 36 are connected at their lower and upper edges to layers 27 and 28 respectively in any suitable manner, such as by stitching and/or gluing. Layers 27 and 28 form a distributing chamber 38 therebetween, and the web or webs 36, there preferably being several of these, divide the chamber into sections 39. If desired, the webs 36 may have holes therein so that the chamber sections 39 communicate with each other. In this case, a single means may be provided for directing gas, such as air or inert gas, into the chamber. However, the web holes may be omitted so that the chamber sections are completely separate from each other. In the latter case, a pipe 42 extends into each chamber section 39 by means of which gas under pressure may be directed into the latter. Each pipe may just open into its chamber section, or it may be connected to a light flexible pipe 43 extending the length of its chamber section, and said pipe may have a plurality of holes 44 therein throughout its length. In this way, gas entering the chamber section through pipe 42 is distributed evenly throughout said section. Furthermore, when the section is collapsed, the pipe 43 directs air through the pervious layer and it keeps at least part of layer 28 away from layer 27 so that there is an opening therebetween sufficient to allow some gas to enter the section when the air is first directed thereto. This starts the fluidizing operation and the movement of layer 28 away from layer 27 so that it is always possible to get gas into the section. Gas may be directed into all the sections 39 at the same time, but it is preferable selectively to direct it into the sections at desired times. As the valve mechanism for doing this is very simple, and does not form part of the invention, it is not described or illustrated herein.

Layer 28 may be prevented from billowing away from layer 27 without the use of webs by sewing and/or gluing the layers together along lines where the illustrated webs are.

When it is desired to use the storage compartment for materials in small particle form, the fluidizing floor mat 25 is placed over the bottom of the compartment. If the latter does not slope towards outlet 20, it is preferable to provide the sub floor 17 which will provide a slope towards said outlet. The hooks 33 of the compartment may be passed through grommets 32 in flanges 31 of the mat in order to hold the latter down. The material is then directed into the compartment on top of the mat in any desired manner. As the distributing chamber 38 is deflated at this time, layer 28 lies flat against layer 27. When it is desired to empty the compartment, gas is directed into the distributing chamber under pressure, and it passes through the pervious layer 28 to fluidize the material in the compartment. This material flows out through outlet 20 and pipe 21. The latter may empty into any type of receiver, or a suction hose may be connected to it to direct the material to any desired point.

As stated above, it is preferable to direct gas selectively into the chamber sections 39. In this way, it is not necessary to supply sufficient gas to pass through the entire layer 28 of the mat. When gas is directed into a chamber section, it passes through the portion of layer 28 over said section only. This tends to fluidize the material over the top of said section. As this material moves out of the compartment, gas may be directed to another section 29 and discontinued to the first-mentioned section. If desired, two or more sections may be inflated at the same time.

Figures 5 and 6 illustrate an alternative form of fluidizing floor mat 50 which may be rectangular in shape, as shown, or may be circular or any other required shape. This mat has a gas-impervious lower layer 52, a gas-pervious upper layer 53, and vertical webs 54. A distribution chamber 56 is formed between the upper and lower layers, and the webs divide said chamber into sections 57. Sections 57 extend longitudinally of the mat, and a transverse web 60 extends between layers 52 and 53, spaced inwardly from one end of the mat to form a transverse chamber section 61. This transverse section is independent of chamber sections 57, although the latter may be interconnected. However, it is preferred to provide a pipe 63 for directing gas into each section 57, and each pipe is preferably connected to a perforated light flexible pipe 64 in its section. Another pipe 66 is provided for directing gas into chamber section 61, and this pipe also preferably is connected to a perforated pipe 67 extending longitudinally of the chamber.

When mat 50 is used, it is operated in the same manner as mat 10. However, if it is found that the material fluidized by gas from the distributing chambers 57 is not readily passing out through the outlet 20 of the compartment, gas may be directed into the transverse chamber 61 which is located adjacent said outlet to fluidize the material at this point. This assisting fluidization ensures the material passing through outlet 20.

Referring to Figures 7 to 9, 70 is another alternative form of fluidizing floor mat of any desired general shape. This mat is made up of side sections 72 and 73, which slope inwardly and downwardly to a longitudinal section 74. This mat is usually placed on a sub floor 77 mounted in the storage compartment, the upper surface 78 of said floor being shaped to accommodate the mat sections 72, 73 and 74, as shown in Figure 9. Furthermore, the surface 77 of the sub floor slopes downwardly towards the outlet 20 of the storage compartment so that the mat generally and the longitudinal section 74 in particular slopes towards said outlet. There is no reason why the mat sections 72 and 73 should not be joined at their inner edges and slope outwardly and downwardly to longitudinal sections 74 along each edge of the mat. However, for the sake of convenience, the illustrated form of this mat only will be described in detail.

Mat 70 comprises a gas-impervious lower layer 80, a gas-pervious upper layer 81 forming therebetween a distributing chamber 82. The side sections 72 and 73 of the mat are provided with spaced webs 85 and 86, respectively, which extend from the edge of the mat into the longitudinal sections 74. These webs divide the distribution chamber into lateral sections 87 and 88. The longitudinal section is formed by spaced webs 89 and 90 which extend longitudinally from end to end of the mat across the ends of webs 85 and 86. Gas is supplied to longitudinal sections 74 through a pipe 91 which may be connected to a perforated pipe 92 extending longitudinally of the section, while a pipe 94 is provided for each chamber section 87 and a pipe 95 for each chamber section 88, said pipes preferably being connected respectively to perforated pipes 98 and 99 extending longitudinally of their respective sections.

When mat 70 is in use, gas is directed to any or all of the lateral distribution chamber sections 87 and 88. As the mat sections 72 and 73 are inclined towards the longitudinal section 74, the fluidized material is directed to the latter section. Air is directed through pipe 91 into this section to fluidize the material above it and direct it to the discharge outlet 20 of the storage compartment.

Figures 10 and 11 illustrate another form of fluidizing floor mat which is a variation of that of Figures 7 to 9. Mat 105 has side sections 106 and 107 which correspond to sections 72 and 73 of mat 70. Sections 106 and 107 are divided into transverse distribution chamber sections 110 and 111 into which gas is directed by pipes 112 and 113. Mat sections 106 and 107 slope inwardly and downwardly, to a longitudinal opening 115 in the mat which lies over a suitable conveyor located in sub floor 77. In this example, the conveyor is in the form of an auger 118, said auger extending towards and to the discharge outlet 22 of the compartment, but the conveyor may be in the form of an endless belt or the like.

The material on mat 105 is fluidized by gas directed into the distribution chamber sections 110 and 111. As the mat sections 106 and 107 slope downwardly towards conveyor 118, the material is directed towards said conveyor, which, in turn, moves it towards and through the chamber outlet 20.

Figures 12 and 13 illustrate another alternative form of mat 125 mounted in the storage compartment 10. This mat has a gas-impervious bottom layer 128 and an upper layer 129 secured thereto around their respective peripheries at 130 by sewing and/or gluing. The upper layer may be formed either of gas-impervious or gas-pervious material. In either case, it is so designed that it is raisable to an inclined position, as clearly shown in Figure 12. This mat may have a plurality of spaced webs 133 secured along their lower and upper edges to the bottom layer 128 and upper layer 129 at 134 and 135, respectively, by sewing and/or gluing.

Mat 125 may actually include the formation and/or any of the features described above in connection with the other mats, the illustrated mat being merely to show that the upper layer may be raisable to an inclined position.

The layers 128 and 129 form a gas chamber 138 therebetween, and gas may be directed into this chamber by one or more pipes 139, the gas distribution system being similar to those described above.

When gas is directed into the chamber 138 of mat 125, the mat is inflated, and the upper layer 129 is raised to its inclined position. If the mat is to be used with fairly coarse materials, the upper layer does not need to be air-pervious, in which case, the slope of the layer is sufficient to direct the materials to the storage compartment outlet. However, the upper layer may be air-pervious for any materials, in which case said layer is inclined, but the mat otherwise operates in the same manner as the previously-described mats.

In the above description, reference is made to the fact that the webs of the various mats may be omitted, and this includes mat 125 of Figures 12 and 13. Figure 14 illustrates a mat 144 which comprises bottom and upper layers of material 146 and 147, respectively. These layers form a gas chamber 149 therebetween into which gas may be directed in any desired manner. In order to keep the upper layer from billowing away from the lower layer, these layers are secured together along lines 152 by sewing and/or gluing. Mat 144 is included merely to show how this can be done. It is obvious that this anti-billowing arrangement may be used in any of the above described mats.

Each form of this invention includes a fluidizing floor mat which may be placed on any floor in order to fluidize small particle material which is placed over the mat. The mat may be permanently or removably installed. In most cases, it is preferably removably installed in order that it may be removed so that the storage compartment may be used for other purposes. The mat may be collapsed and folded into a small compact bundle for storage and shipment.

What I claim as my invention is:

1. A fluidizing floor mat to be placed on the floor of a mobile or stationary storage compartment for assisting in the unloading therefrom of materials in small particle form, which compartment has a discharge outlet near its bottom, comprising a bottom layer of gas-impervious material, an upper layer of gas-pervious fluidizing material secured to the impervious layer at the periphery thereof and normally collapsed against said impervious layer to form a collapsed mat to be placed on the floor of a storage compartment, said upper and bottom layers forming a normally-collapsed distributing chamber therebetween, means connected to the upper and bottom layers to reduce the billowing of said upper layer away from said bottom layer and to divide the chamber into independent sections, a perforated pipe extending substantially throughout each chamber section for preventing the upper layer from being completely pressed against the bottom layer under load of material on the mat, and means for directing gas to each perforated pipe for discharge into the chamber section thereof independently of the other sections, said gas being distributed throughout the chamber sections by the perforated pipes thereof and passing through the pervious layer to fluidize small particle material over the mat.

2. A fluidizing floor mat to be placed on the floor of a mobile or stationary storage compartment for assisting in the unloading therefrom of materials in small particle form, which compartment has a discharge outlet near its bottom, comprising a bottom layer, an upper layer of gas-pervious fluidizing material secured to the periphery of said bottom layer for forming a distributing chamber therebetween, said upper layer being normally collapsed against said bottom layer, at least one perforated pipe extending substantially across said distributing chamber for preventing said upper layer from being pressed completely against said bottom layer by a load of particle material on the mat, and means for directing gas through said perforated pipe into the distributing chamber for distribution in the chamber by said pipe to pass through the upper layer for fluidizing small particle material above the mat.

3. A fluidizing floor mat to be placed on the floor of a mobile or stationary storage compartment for assisting in the unloading therefrom of materials in small particle form, which compartment has a discharge outlet near its bottom, comprising a bottom layer, an upper layer of gas-pervious fluidizing material secured to the periphery of said bottom layer for forming a distributing chamber therebetween, said upper layer being normally collapsed against said bottom layer, means inwardly of the peripheries of said layers and connecting said upper and bottom layers to reduce billowing of said upper layer away from said bottom layer, at least one perforated pipe extending substantially across said distributing chamber for preventing said upper layer from being pressed completely against said bottom layer by a load of particle material on the mat, and means for directing gas through said perforated pipe into the distributing chamber for distribution in the chamber by said pipe to pass through the upper layer for fluidizing small particle material above the mat.

4. A fluidizing floor mat to be placed on the floor of a mobile or stationary storage compartment for assisting in the unloading therefrom of materials in small particle form, which compartment has a discharge outlet near its bottom, comprising a bottom layer, an upper layer of gas-pervious fluidizing material secured to the periphery of said bottom layer for forming a distributing chamber therebetween, said upper layer being normally collapsed against said bottom layer, a plurality of spaced webs having their opposite edges connected respectively to said upper and bottom layers at locations spaced inwardly from their peripheries to reduce the billowing of said upper layer away from said bottom layer and to divide said distributing chamber into independent sections, a perforated pipe extending substantially across each chamber section, and means for supplying gas to each perforated pipe for discharge into its chamber section and passage through the portion of said pervious upper layer of said section to fluidize small particle material above the mat.

5. A fluidizing floor mat to be placed on the floor of a mobile or stationary storage compartment for assisting in the unloading therefrom of materials in small particle form, which compartment has a discharge outlet near its bottom, comprising a pliable bottom layer of gas-impervious material, an upper layer of pliable gas-pervious material secured to the periphery of said pliable bottom layer for forming a distributing chamber therebetween, said upper layer being normally collapsed against said bottom layer, a plurality of spaced pliable webs having their opposite edges connected respectively to said upper and bottom layers at locations spaced inwardly from their peripheries to reduce the billowing of said upper layer away from said bottom layer and to divide said distributing chamber into independent sections, a flexible perforated pipe extending substantially across each chamber section, and means for supplying gas to each perforated pipe for discharge into its chamber section and passage through the portion of said pervious upper layer of said section to fluidize small particle material above the mat, said mat being foldable into a compact bundle.

6. A fluidizing floor mat to be placed on the floor of a mobile or stationary storage compartment for assisting in the unloading therefrom of materials in small particle form, which compartment has a discharge outlet near its bottom, comprising a bottom layer, an upper layer of gas-pervious fluidizing material secured to the periphery of said bottom layer for forming a distributing chamber therebetween, said upper layer being normally collapsed against said bottom layer, a plurality of spaced webs having their opposite edges connected respectively to said upper and bottom layers at locations spaced inwardly from their peripheries to reduce the billowing of said upper layer away from said bottom layer and to divide said distributing chamber into independent sections, at least one web extending across the other webs to form at least one section independent of the other sections, a perforated pipe extending substantially across each chamber section, and means for supplying gas to each perforated pipe for discharge into its chamber section and passage through the portion of said pervious upper layer of such section to fluidize small particle material above the mat.

7. A fluidizing floor mat to be placed on the floor of a mobile or stationary storage compartment for assisting in the unloading therefrom of materials in small particle form, which compartment has a discharge outlet near its bottom comprising a bottom layer of gas-impervious material, an upper layer of gas-pervious fluidizing material secured to the impervious layer at the periphery thereof and normally collapsed against said impervious layer to form a collapsed mat to be placed on the floor of a storage compartment and over which small particle material may be placed within the compartment, said upper and bottom layers forming a normally-collapsed distributing chamber therebetween, a plurality of spaced webs connected along the edges thereof to the upper and bottom layers to reduce the billowing of said upper layer away from said bottom layer and to divide the chamber into independent sections, at least one web extending across the other webs connected along the edges thereof to the upper and bottom layers to form at least one section independent of the other sections, said webs being wide enough to permit the entire upper layer to move away from the bottom layer while remaining substantially parallel thereto, means for directing gas into each independent chamber section, means for directing gas into said other chamber sections, a flexible perforated pipe extending along each chamber section and connected to the means for directing gas into said section, said gas on entering the chamber sections raising the upper layer to its substantially parallel position above the bottom layer and passing through the pervious layer to fluidize small particle material over the mat while the webs within the chambers prevent the formation of troughs in said upper layer without interfering with the fluidizing action.

References Cited in the file of this patent

UNITED STATES PATENTS

| | | |
|---|---|---|
| 1,759,983 | Houston | May 27, 1930 |
| 1,792,286 | Curry | Feb. 10, 1931 |
| 2,527,466 | Townsend | Oct. 24, 1950 |
| 2,723,054 | Londen | Nov. 8, 1955 |
| 2,805,896 | Yellott | Sept. 10, 1957 |
| 2,805,897 | Yellott | Sept. 10, 1957 |

FOREIGN PATENTS

| | | |
|---|---|---|
| 765,158 | Great Britain | Jan. 2, 1957 |